United States Patent
Gao et al.

(10) Patent No.: US 12,233,878 B2
(45) Date of Patent: Feb. 25, 2025

(54) ENHANCED RIDER PAIRING FOR AUTONOMOUS VEHICLES

(71) Applicant: Argo AI, LLC, Pittsburgh, PA (US)

(72) Inventors: Shenglong Gao, Sunnyvale, CA (US); Israel Marc Kositsky, Cranberry Township, PA (US); Ramadev Burigsay Hukkeri, Pittsburgh, PA (US); Thomas Mark Petroff, Gibsonia, PA (US); Scott Plant, San Jose, CA (US); Brett Browning, Pittsburgh, PA (US); Shubhashree Venkatesh, Palo Alto, CA (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 370 days.

(21) Appl. No.: 17/344,852

(22) Filed: Jun. 10, 2021

(65) Prior Publication Data
US 2022/0297698 A1 Sep. 22, 2022

Related U.S. Application Data

(60) Provisional application No. 63/163,598, filed on Mar. 19, 2021.

(51) Int. Cl.
*B60W 40/08* (2012.01)
*B60W 60/00* (2020.01)
(Continued)

(52) U.S. Cl.
CPC ........ *B60W 40/08* (2013.01); *B60W 60/0021* (2020.02); *B60W 60/0023* (2020.02);
(Continued)

(58) Field of Classification Search
CPC ............ B60W 40/08; B60W 60/0021; B60W 60/0023; B60W 2540/043;
(Continued)

(56) References Cited

U.S. PATENT DOCUMENTS

2015/0161564 A1* 6/2015 Sweeney ........ G06Q 10/063114
705/338
2017/0075358 A1* 3/2017 Zhang .................. G05D 1/0297
(Continued)

OTHER PUBLICATIONS

International Search Report and Written Opinion of the International Searching Authority directed to related International Patent Application No. PCT/US2022/020998, mailed Mar. 18, 2022; 9 pages.

*Primary Examiner* — Tyler J Lee
*Assistant Examiner* — Kimia Kohankhaki
(74) *Attorney, Agent, or Firm* — Sterne, Kessler, Goldstein & Fox P.L.L.C.

(57) ABSTRACT

Devices, systems, and methods are provided for enhanced rider pairing of an autonomous vehicle (AV). A system may pair a first user profile of a first user located at a first location with a first autonomous vehicle (AV) to complete a trip to a destination selected by the first user. The system may detect a second AV at the first location, wherein the second AV is associated with a second user profile. The system may connect the second AV with the first user using a connection mechanism. The system may select a profile status of the first user profile based on the connection to the second AV. The system may pair the first user profile with the second AV based on the profile status.

20 Claims, 6 Drawing Sheets

(51) Int. Cl.
*H04W 4/40* (2018.01)
*H04W 4/80* (2018.01)

(52) U.S. Cl.
CPC .............. *H04W 4/40* (2018.02); *H04W 4/80* (2018.02); *B60W 2540/043* (2020.02); *B60W 2540/045* (2020.02)

(58) Field of Classification Search
CPC ... B60W 2540/045; H04W 4/40; H04W 4/80; G06Q 10/0631; G06Q 10/02; G06Q 50/30
See application file for complete search history.

(56) References Cited

U.S. PATENT DOCUMENTS

| | | | |
|---|---|---|---|
| 2017/0300053 A1* | 10/2017 | Wengreen | G06Q 50/40 |
| 2018/0188731 A1* | 7/2018 | Matthiesen | G01C 21/3664 |
| 2019/0094859 A1* | 3/2019 | Nix | G06Q 10/02 |
| 2019/0354112 A1 | 11/2019 | Zhang | |
| 2020/0103239 A1 | 4/2020 | Schwie et al. | |
| 2020/0254974 A1* | 8/2020 | Gordon | G06Q 50/40 |
| 2020/0342764 A1 | 10/2020 | Shirani-Mehr et al. | |
| 2020/0349666 A1 | 11/2020 | Hodge et al. | |

* cited by examiner ately, the vehicle should be able to take either of those two riders. In comparison to traditional cars, where the driver is assigned to a ride, self-driving vehicles have a distinct advantage because the driver of a traditional car limits the number of riders that can be paired because a contractor may select whomever they choose. As long as the desired trip is feasible with the vehicles (e.g., having enough charge/gas, etc.) with autonomous vehicles, the vehicles make no distinction between passengers.

ENHANCED RIDER PAIRING FOR AUTONOMOUS VEHICLES

CROSS-REFERENCE TO RELATED APPLICATION(S)

This application claims the benefit of U.S. Provisional Application No. 63/163,598, filed Mar. 19, 2021, the disclosure of which is incorporated herein by reference as if set forth in full.

TECHNICAL FIELD

This disclosure generally relates to systems, devices, and methods for enhanced rider pairing for autonomous vehicles.

BACKGROUND

In today's transportation ecosystem, bottlenecks can significantly hinder traffic. This is particularly apparent in areas that experience high bursts of traffic where multiple riders are requesting multiple ride-hail vehicles. There is a need to facilitate an enhanced mechanism of pairing riders with vehicles.

Figure 1:
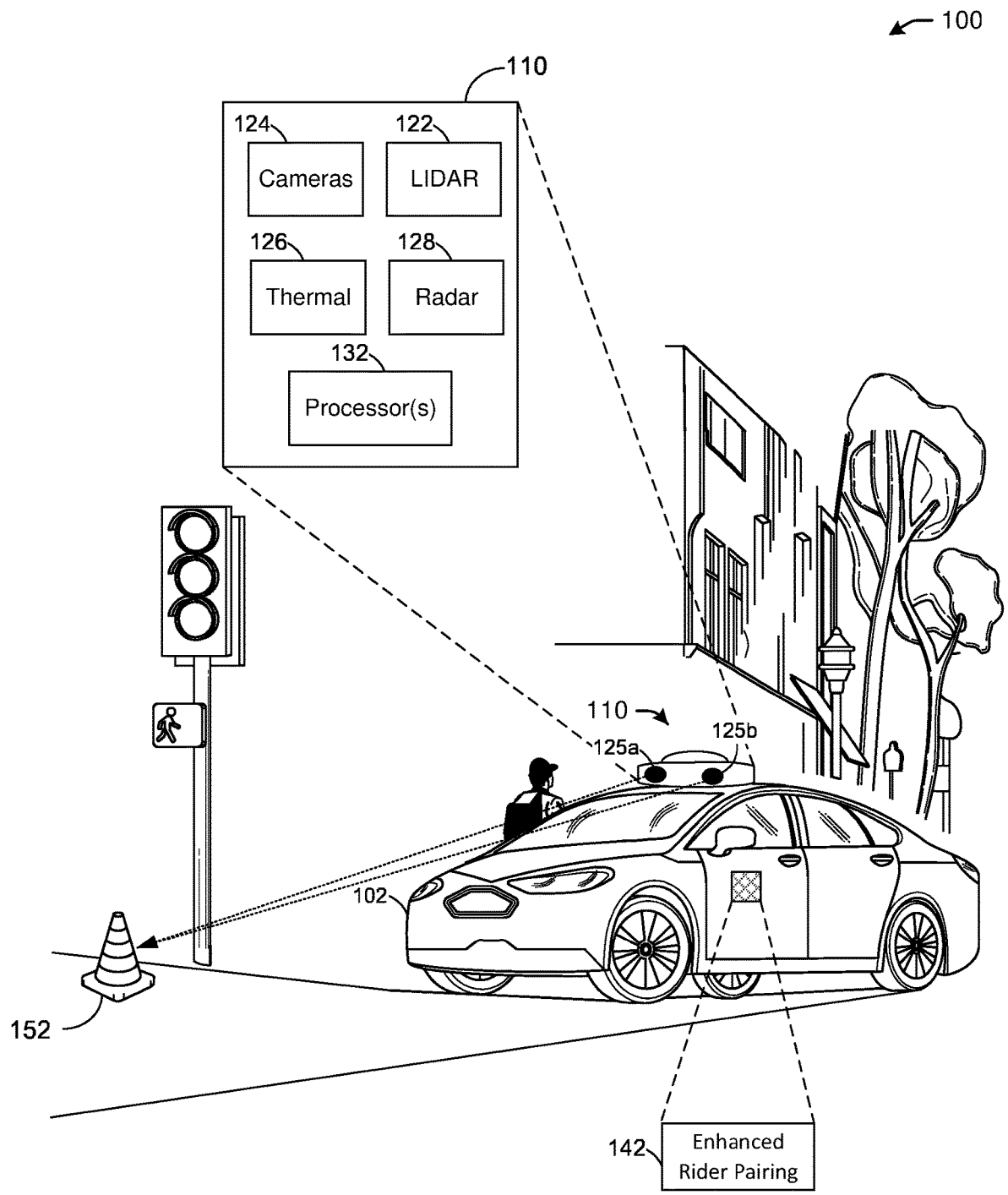
FIG. 1 illustrates an example environment of a vehicle, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Bottlenecks are a major stumbling block in today's transportation ecosystem, particularly in areas where large crowds are searching for a ride. Airports, concert halls, and sporting stadiums are examples of these areas. High numbers of people searching for rides, vehicles picking up and dropping off passengers, and emergency services responding to accidents may all be present in these areas. Bottlenecks occur in these areas due to a lack of coordination between vehicles and passengers. For example, a rider possibly selecting the wrong vehicle after hailing a ride. Rendezvous areas are frequently ill-defined and may result in a rider mistaking their ride with another rider's vehicle. This may cause traffic delays, creating a wasteful, and potentially unfavorable ripple effect.

The current ride-hail model depends on humans as contract drivers. These contract drivers accept trips for a variety of reasons including money, distance, direction, etc. When multiple ride-hail vehicles arrive at a given location, the riders may have difficulty determining which vehicle is theirs. This is especially problematic with vehicles that look similar or in states where front plates are not required. Riders can also get into the wrong vehicle. This issue is exacerbated by autonomous vehicles, which will likely have a similar look rendering them not easily distinguishable.

When a user hails a vehicle from a group of vehicles or a fleet of vehicles, most of these vehicles may look slightly different, but at an airport, for example, a group of people may hail a ride and a range of black small vehicles may arrive. The user may be unable to determine which vehicle belongs to him or her. It would be inconvenient for a user to switch from vehicle to vehicle or attempting to find out which one is theirs. A user may check for a license plate, but some states do not require license plates to be displayed on the front of the vehicle.

Autonomous vehicles do not have drivers and work on program logic rather than individual logic. This means that to an autonomous vehicle, it is more or less irrelevant who it picks up. Thus, if two riders are waiting to be picked up, the autonomous vehicle should be able to take either of those two riders. In comparison to traditional cars, where the driver is assigned to a ride, self-driving vehicles have a distinct advantage because the driver of a traditional car limits the number of riders that can be paired because a contractor may select whomever they choose. As long as the desired trip is feasible with the vehicles (e.g., having enough charge/gas, etc.) with autonomous vehicles, the vehicles make no distinction between passengers.

Example embodiments described herein provide certain systems, methods, and devices for an enhanced rider pairing system.

In one or more embodiments, an enhanced rider pairing system may facilitate using a mechanism to re-pair or re-authenticate a rider with an autonomous vehicle in order to complete a trip. Some of these mechanisms may include scanning a quick response (QR) code, using an application on a mobile device, connecting through a Bluetooth® signal, detecting a distance from the user to the vehicle, scanning a fingerprint of the rider, face recognition or other mechanisms that the rider may use to pair with a vehicle. As a result, based on authentication, a rider can switch between some vehicles. Leveraging this solution, trips can be re-paired if the rider selects a different vehicle.

In one or more embodiments, an enhanced rider pairing system may facilitate scanning any substitutable vehicle and at the backend, re-pairing the user to the substitutable vehicle. For example, if two users are at the airport and both request a ride, and two vehicles arrive a couple of minutes apart, the first user may be able to board either vehicle. However, when the first user scans the vehicle, the vehicle may determine that a different user scanned the QR code (or other pairing methods, such as Bluetooth®, near-field communication (NFC), distance to the vehicle, etc.). The vehicle may then retrieve and pair with the first user's trip if it is determined that this first user is an authorized substitute.

In one or more embodiments, an authorized substitute is determined based on meeting certain criteria or thresholds. This may be dependent on a distance or arrival time, for example. Example criteria may be that the estimated time of arrival should be less than a time threshold (e.g., one or two minutes). If a user hails a vehicle with a 15-minute estimated arrival time but another vehicle is already waiting, the user might not be an authorized substitute to take the waiting vehicle because the user did not meet the time criteria.

In one or more embodiments, there is also an authorized substitute from the perspective of the vehicle as well. For example, autonomous vehicles may impose criteria or a threshold before allowing a user to be an authorized substitute. This criteria or threshold may be based on the trip selected by the user, the user profile, the distance, or amount of gas or charge in the vehicle, or other criteria.

In one or more embodiments, an enhanced rider pairing system may enable a user to unpair or uncouple from a first vehicle once the user is paired with a second vehicle (e.g., a substitutable vehicle). Enabling the user to unpair from the first vehicle allows the first vehicle to be available for other users to pair with. This prevents the situations where a user is paired with multiple vehicles, which may block other users from pairing with an already paired vehicle. Alternatively, the an enhanced rider pairing system may facilitate simultaneously pairing a user with multiple vehicles but allows for unpairing or decoupling the user from a first vehicle once the user is granted access to a second vehicle. This allows the user continues to be paired with both vehicles in case the second vehicle could not satisfy the trip requirement and may need to access the first vehicle.

In one or more embodiments, an enhanced rider pairing system may include one or more locked cargo storage compartments (e.g., lockers, trunks, boxes, etc.) assigned to designated recipients. These locked cargo storage compartments may be unlocked by the designated recipient by scanning the correct QR code with a user mobile device or any other device capable of sending and receiving signals (e.g., Wi-Fi, Bluetooth®, NFC, or other protocols). It should be understood that the QR code is an illustrative example and that other mechanisms may be used to unlock a storage compartment such as the fingerprint of the user or based on recognition of the user profile.

In one or more embodiments, the enhanced rider pairing system may work the same way for the senders loading goods into particular storage compartments to be sent to the recipient. The QR code may be used to unlock and assign the storage compartment, apply charges, and/or trigger a form for the sender to input shipping information, etc. It is understood that the above descriptions are for purposes of illustration and are not meant to be limiting.

In some embodiments, a concept of predetermined queue locations (PQLs) may be used. These are essentially places where a user enters a queue in a large area where a large number of people can call vehicles or where a user may be in a restricted area with PQL (e.g., hotels, airports, or the like). For PQLs, because it is a predetermined area that they have selected, one could potentially pair a vehicle with an area first and not even add a rider. When the vehicle arrives at this PQL, it selects a passenger.

In one or more embodiments, an enhanced rider pairing system may facilitate entry into substitutable cars in a ride pickup location prior to selecting a trip. For example, a user may scan an autonomous vehicle before having selected a destination for a trip that the user may be wanting to take. A user may scan the autonomous vehicle that may be a substitutable vehicle that the user may select even if the vehicle is already assigned to another user. In this case, the user may enter the autonomous vehicle, and then after that, the user may supply the destination of the trip. This may enhance the user experience. For example, in certain weather conditions, a user may benefit from being allowed entry into an autonomous vehicle before selecting a trip. In case of inclement weather, the user may not wish to stand outside of an available vehicle while waiting for a ride that may be assigned to the user to complete the trip. A user profile may pair with the vehicle using pairing mechanisms (e.g., scanning a QR code, connecting with a mobile device, pairing using Bluetooth®, NFC, or other mechanisms). When the user enters the autonomous vehicle, the user may select a destination, which may be shared with the autonomous vehicle. The trip information may be shared with the autonomous vehicle through a direct connection to the vehicle or a cloud service. The autonomous vehicle may then analyze the trip information and may determine whether the destination is reachable with the current condition of the autonomous vehicle. For example, the vehicle may assess whether there is enough fuel or electric charge to reach the destination and complete the trip. In case the autonomous vehicle cannot reach the destination or complete the trip, the autonomous vehicle may indicate to the user to call for another vehicle before starting the trip. The user may have the option of waiting for another autonomous vehicle inside or outside the autonomous vehicle. When another autonomous vehicle is dispatched, the user may be notified of the arrival of the other vehicle in order to make the switch between the two vehicles.

In one or more embodiments, an enhanced rider pairing system may employ a mechanism to alert the user to board a specific autonomous vehicle from a pool of autonomous vehicles accessible at a given location. For example, the mechanism may cause the autonomous vehicle to emit an audible signal, show a visual representation on the automated vehicle or a device associated with the user (e.g., a mobile device) that indicates the pairing between the user and the autonomous vehicle, or any other mechanism that allows the user to recognize the autonomous vehicle that is paired with the user.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates example environment 100 of a vehicle 102, in accordance with one or more example embodiments of the present disclosure.

The modern automobile may have many electronic control units (ECUs) for various subsystems. Some of these subsystems may be used to provide proper operation of the vehicle. Some examples of these subsystems may include a braking subsystem, a cruise control subsystem, a power windows and doors subsystem, battery charging subsystem for hybrid and electric vehicles, or other vehicle subsystems. Communication between the various subsystems is an important feature of operating vehicles. A controller area network (CAN) bus may be used to allow the subsystems to communicate with each other. Such communications provide a wide range of safety, economy and convenience features to be implemented using software. For example, sensor inputs from the various sensors around the vehicle may be communicated between the various ECUs of the vehicle via the CAN bus to perform actions that may be essential to the performance of the vehicle. An example may include auto lane assist and/or avoidance systems where such sensor inputs are used by the CAN bus to communicate these inputs to the driver assist system such as lane departure warning, which in some situations may actuate breaking active avoidance systems.

Referring to FIG. 1, there is shown a vehicle 102 having a sensor system 110 for a plurality of cameras, emitters, and sensors. The vehicle 102 may be an autonomous vehicle (AV). The vehicle 102 may comprise an enhanced rider pairing system 142 that facilitates a hail ride user to authenticate with the vehicle 102.

The sensor system 110 may be connected to the vehicle 102 (e.g., on top of the vehicle 102 as shown). In this environment 100, there is shown that sensor system 110 includes cameras such as stereo cameras 125a and 125b. The stereo cameras 125a and 125b may capture images of objects (e.g., object 152) in the vicinity and around the vehicle 102. Other emitters and sensors in the sensor system 110 may transmit and/or receive one or more signals in order to detect and/or capture information associated with objects in the vicinity and around the vehicle 102. For example, a LIDAR sensor may transmit a LIDAR signal (e.g., light or an electromagnetic wave), a radar uses radio waves in order to determine distances between the vehicle and objects in the vicinity of the vehicle, and a thermal sensor may capture temperature (e.g., based on an emitted and detected infrared signal or other laser signals).

In one or more embodiments, the sensor system 110 may include LIDAR 122. Some examples of a LIDAR such as Geiger mode LIDAR, ground-based LIDAR, large footprint LIDAR, small footprint LIDAR, or the like. The sensor system 110 may include cameras 124 such as stereo cameras that may capture images in the vicinity of the vehicle 102. The sensor system 110 may include a thermal sensor 126, such as thermistors, resistance temperature detectors, thermocouples, semiconductors, or the like. Further, the sensor system may include a radar 128, which may be any radar that uses radio waves to capture data from objects surrounding the vehicle 102. The sensor system 110 may also include one or more processors 132. The one or more processors 132 may control the transmission and reception of signals using the LIDAR 122, the cameras 124, the thermal sensor 126, and the radar 128. The various sensors of the sensor system 110, when calibrated correctly, may indicate a proper distance and shape of object 152. It is understood that the above descriptions are for purposes of illustration and are not meant to be limiting.

Figure 2:
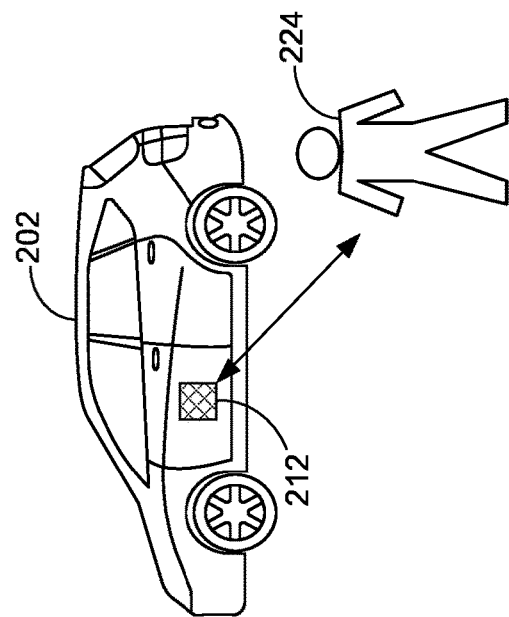
FIG. 2 depicts an illustrative schematic diagram for an enhanced rider pairing system, in accordance with one or more example embodiments of the present disclosure.
Figure 2:
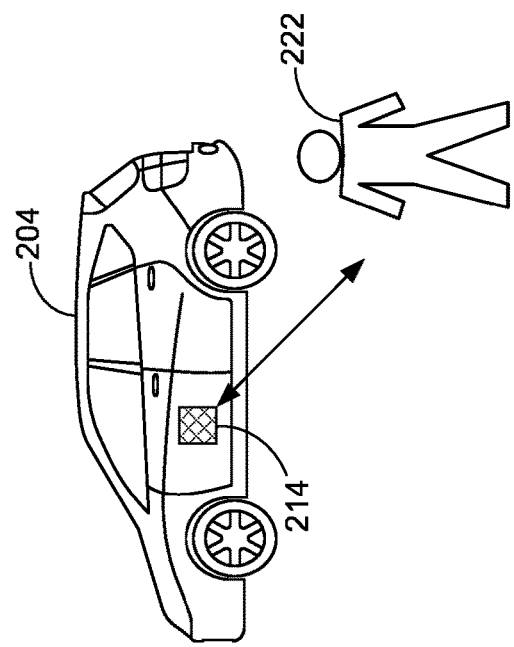

FIG. 2 depicts an illustrative schematic diagram for an enhanced rider pairing system, in accordance with one or more example embodiments of the present disclosure.

Referring to FIG. 2, in this environment 200, there is shown a user 222 and a user 224 waiting for their respective ride. For example, two autonomous vehicles are shown (e.g., vehicle 202 and vehicle 204) that may have arrived a few minutes apart. Vehicles 202 and 204 may be part of an autonomous fleet that services a location. When the users 222 and 224 hail their rides, these vehicles are dispatched. For example, vehicle 202 may have been assigned/paired with the user 222 and the vehicle 204 may have been assigned/paired with the user 224. However, in some embodiments, the user 222 may be able to board either vehicle even though user 222 did not hail vehicle 204. For example, if user 222 wishes to board vehicle 204, user 222 may establish a new pairing session to connect with the vehicle 204 through connection means such as scanning a QR code 214 on the vehicle 204, establishing a Bluetooth® connection, an NFC connection, establishing a connection based on a distance to the vehicle, or other types connections means. The vehicle 204 may retrieve and pair user 222's trip information with vehicle 204 when it is determined that the user 222 is an authorized substitute. Similarly, user 224 may board vehicle 202 after re-establishing a pairing session with the vehicle 204 if using QR code 212 on vehicle 202 (or other pairing methods, such as Bluetooth®, near-field communication (NFC), distance to the vehicle, etc.). Some examples of devices that a user (e.g., users 222 or 224) may use to determine if the user is an authorized substitute with an autonomous vehicle (e.g., vehicles 202 or 204) comprise using a mobile device, using a device capable of sending and receiving Bluetooth® signals, a device capable of determining a distance from the user to the vehicle, a device capable of detecting a fingerprint of the user, a device capable of performing recognition techniques to recognize the user or user profile. Based on successful authentication, the vehicle and user pairing may switch between a number of vehicles and user profiles.

In one or more embodiments, an enhanced rider pairing system may enable the user 222 to unpair or uncouple from the vehicle 202 once the user 222 is paired with the vehicle 204. Enabling the user 222 to unpair from the vehicle 202 allows the vehicle 202 to be available for other users (e.g., user 224) to pair with. Alternatively, the enhanced rider pairing system may facilitate simultaneously pairing user 222 with both vehicles 202 and 204 but allows for unpairing or decoupling the user 222 from vehicle 202 once the user is granted access to the vehicle 224.

In some embodiments, the enhanced rider pairing system may be implemented in PQLs. PQLs may be identified by an identification (ID). Some examples of PQLs may include locations such as hotels, airports, or the like. Because PQLs define a predetermined area that has been established, a vehicle is first assigned or paired with an area first without selecting or pairing with a rider until a later time. When the vehicle arrives at a specific PQL, it may be selected by a rider or the vehicle can select the rider. For example, when a rider calls or hails a vehicle, that rider is paired to that vehicle. Multiple vehicles may be paired with riders that have a similar pick up dropoff (PUDO) point based on the IDs of PQLs. When vehicles are called to these similar locations, an enhanced rider pairing system may facilitate substituting the pairing between vehicles and riders. A substitution determination may be made based on a variety of factors such as closeness (e.g., distance, time, etc.) between the rider and the autonomous vehicle, vehicle type, rider profile, trip information, etc.

In one or more embodiments, an authorized substitute is determined based on meeting certain criteria or thresholds. For example, the criteria or threshold may be dependent on distance or arrival time. In that case, if a user hails an autonomous vehicle with a few minutes estimated arrival time but a second autonomous vehicle is present that may be assigned to a different user, an enhanced rider pairing system may deny or allow the user's access to the second autonomous vehicle based on a time threshold. In case the estimated time of arrival is greater than the time threshold, the enhanced rider pairing system may deny access to the second autonomous vehicle and the user may not be selected as an authorized substitute. However, if the estimated time of arrival is below the time threshold, the enhanced rider pairing system may allow access to the second autonomous vehicle and the user may be selected as an authorized substitute.

In one or more embodiments, an authorized substitute may be set from the perspective of the vehicle. For example, autonomous vehicles may impose criteria or a threshold before selecting a user to be an authorized substitute. This criteria or threshold may be based on the trip selected by the user, the distance, or amount of gas or charge in the vehicle, or other criteria. For example, if two autonomous vehicles are present at a location, a user may be an authorized substitute if the vehicles can complete the trip for that user. However, if the second vehicle is not able to complete the trip due to not enough charge in the vehicle to reach the destination, then the enhanced rider pairing system may deny the user access to that vehicle.

An enhanced rider pairing system may facilitate that one rider may be paired with someone else's autonomous vehicle (or an unpaired autonomous vehicle). When these two rides are substitutable, the rider who scans the other autonomous vehicle may be matched with the scanned autonomous vehicle. An enhanced rider pairing system may pair the rider ID with the vehicle ID as an authorized substitute. The rider's original autonomous vehicle may be paired with the rider for the substituted autonomous vehicle.

In one or more embodiments, an enhanced rider pairing system may employ a mechanism to alert a user (e.g., users 222 or 224) to board a specific autonomous vehicle (e.g., vehicle 204 or 206) from a pool of autonomous vehicles accessible at a given location. For example, the mechanism may cause an autonomous vehicle (e.g., vehicle 204 or 206) to emit an audible signal, show a visual representation on the automated vehicle or a device associated with the user (e.g., a mobile device) that indicates the pairing between the user (e.g., users 222 or 224) and the autonomous vehicle (e.g., vehicle 204 or 206), or any other mechanism that allows the user to recognize the autonomous vehicle that is paired with the user.

Some of the advantages of the enhanced rider pairing system include improved rider experience, where the user does not have to search for a specific autonomous vehicle among many vehicles. This also may result in better utilization of autonomous vehicles because of them being used more quickly without having to wait for their original riders at that location. It is understood that the above descriptions are for purposes of illustration and are not meant to be limiting.

Figure 3:
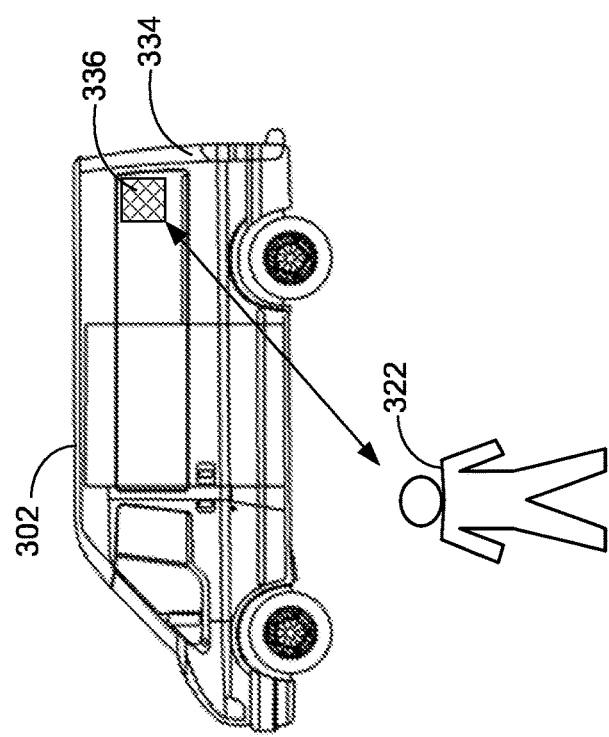
FIG. 3 depicts an illustrative schematic diagram for an enhanced rider pairing system, in accordance with one or more example embodiments of the present disclosure.

FIG. 3 depicts an illustrative schematic diagram for an enhanced rider pairing system, in accordance with one or more example embodiments of the present disclosure.

In one or more embodiments, an enhanced rider pairing system may provide access to the locked cargo storage compartments (e.g., lockers, vehicle trucks, boxes, etc.) that may be assigned to one or more designated users.

Referring to FIG. 3, in this environment 300, there is shown a truck 302 that may be associated or paired with a user 322. The truck 302 may comprise one or more cargo storage compartments that may be accessed using the enhanced rider pairing system. For example, the truck 302 may comprise a door 334 that may permit the user 322 to access the content inside the truck 302 using the enhanced rider pairing system (e.g., enhanced rider pairing system 142 of FIG. 1).

Locked cargo storage compartments (e.g., storage compartment 234) may be unlocked by the designated recipient (e.g., user 322). For example, the user 322 may scan a QR code (e.g., QR code 336) with a mobile device or any other device capable of sending and receiving signals (e.g., Wi-Fi, Bluetooth®, NFC, or other protocols). It should be understood that the QR code is an illustrative example and that other mechanisms to unlock a storage compartment may be used, such as a fingerprint of the user, or even based on recognition of the user. The enhanced rider pairing system may work the same way for senders loading goods into particular storage compartments to be sent to another recipient. The QR code 236 may be used to unlock and assign the storage compartment, apply charges, and/or trigger a form for the sender to input shipping information, etc. It is understood that the above descriptions are for purposes of illustration and are not meant to be limiting.

Figure 4:
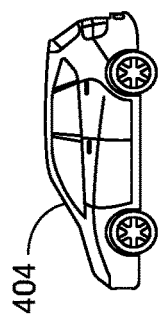
FIG. 4 depicts an illustrative schematic diagram for an enhanced rider pairing system, in accordance with one or more example embodiments of the present disclosure.
Figure 4:
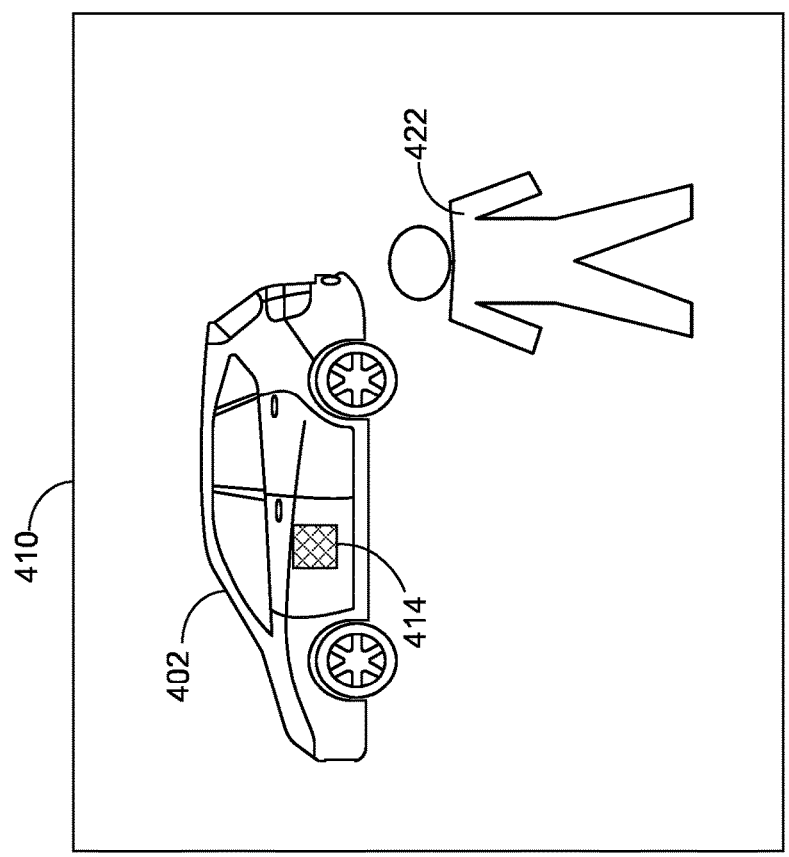

FIG. 4 depicts an illustrative schematic diagram for an enhanced rider pairing system, in accordance with one or more example embodiments of the present disclosure.

Referring to FIG. 4, in this environment 400, there is shown an autonomous vehicle 402 that may be located at a pickup location 410. At that location 410, there may be a user 422 waiting but user 422 may not have selected a trip yet. The user 422 may hail a vehicle 404 for the trip but the vehicle 404 may not be at the location 410. An enhanced rider pairing system may facilitate that the user 422 may enter into a substitutable vehicle prior to selecting a trip. For example, the user 422 may establish a connection with autonomous vehicle 402 before having selected a destination for the trip. The user 422 may select a substitutable vehicle (e.g., vehicle 402) even if the vehicle 402 may have been already assigned to another user. In this case, the user 422 may enter the autonomous vehicle 402 and then after that, the user 422 may supply the destination of the trip such that the vehicle 402 may complete the trip for the user 422. In such a case, the user experience may be enhanced because, under certain weather conditions, the user 422 may benefit from being allowed entry into the vehicle 402 before selecting a trip. For example, in case of inclement weather, the user may not wish to wait outside of an available vehicle while waiting for the vehicle 404 that may be assigned to the user 422 to complete the trip. The user 422 may connect to the vehicle 402 using any connection mechanism, for example, scanning QR code 414 or other mechanisms such as connecting through Bluetooth®, NFC, fingerprint, face recognition, etc. When the user 422 enters the autonomous vehicle 402, the user 422 may select a destination, which may be shared with the autonomous vehicle 402. The trip information may be shared with the autonomous vehicle 402 through a direct connection to the vehicle or a connection to a cloud service. The autonomous vehicle 402 may then analyze the trip information and may determine whether the destination is reachable with the current condition of the autonomous vehicle 402. For example, the vehicle may assess whether there is enough fuel or electric charge to reach the destination and complete the trip. In case the autonomous vehicle 402 cannot reach the destination or complete the trip, the autonomous vehicle 402 may indicate to the user to request another vehicle. The user 422 may have the option of waiting for another autonomous vehicle inside or outside the autonomous vehicle 402. When another autonomous vehicle is dispatched, the user 422 may be notified of the arrival of the other autonomous vehicle in order to make the switch between the two vehicles. It is understood that the above descriptions are for purposes of illustration and are not meant to be limiting.

Figure 5:
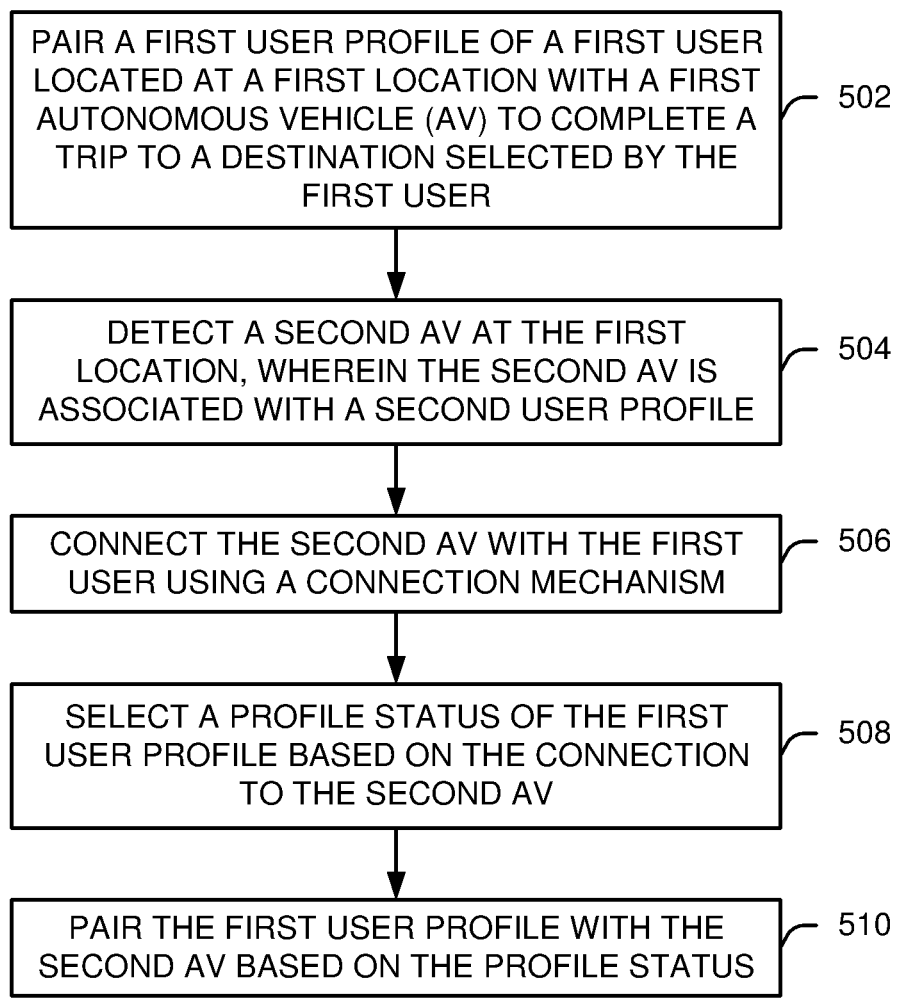
FIG. 5 illustrates a flow diagram of a process for an enhanced rider pairing system, in accordance with one or more example embodiments of the present disclosure.

FIG. 5 illustrates a flow diagram of process 500 for an enhanced rider pairing system, in accordance with one or more example embodiments of the present disclosure.

At block 502, a system (e.g., the enhanced rider pairing system of FIG. 1) may pair a first user profile of a first user located at a first location with a first autonomous vehicle (AV) to complete a trip to a destination selected by the first user At block 504, the system may detect a second AV at the first location, wherein the second AV is associated with a second user profile.

At block 506, the system may connect the second AV with the first user using a connection mechanism.

At block 508, the system may select a profile status of the first user profile based on the connection to the second AV.

At block 510, the system may pair the first user profile with the second AV based on the profile status.

It is understood that the above descriptions are for purposes of illustration and are not meant to be limiting.

Figure 6:
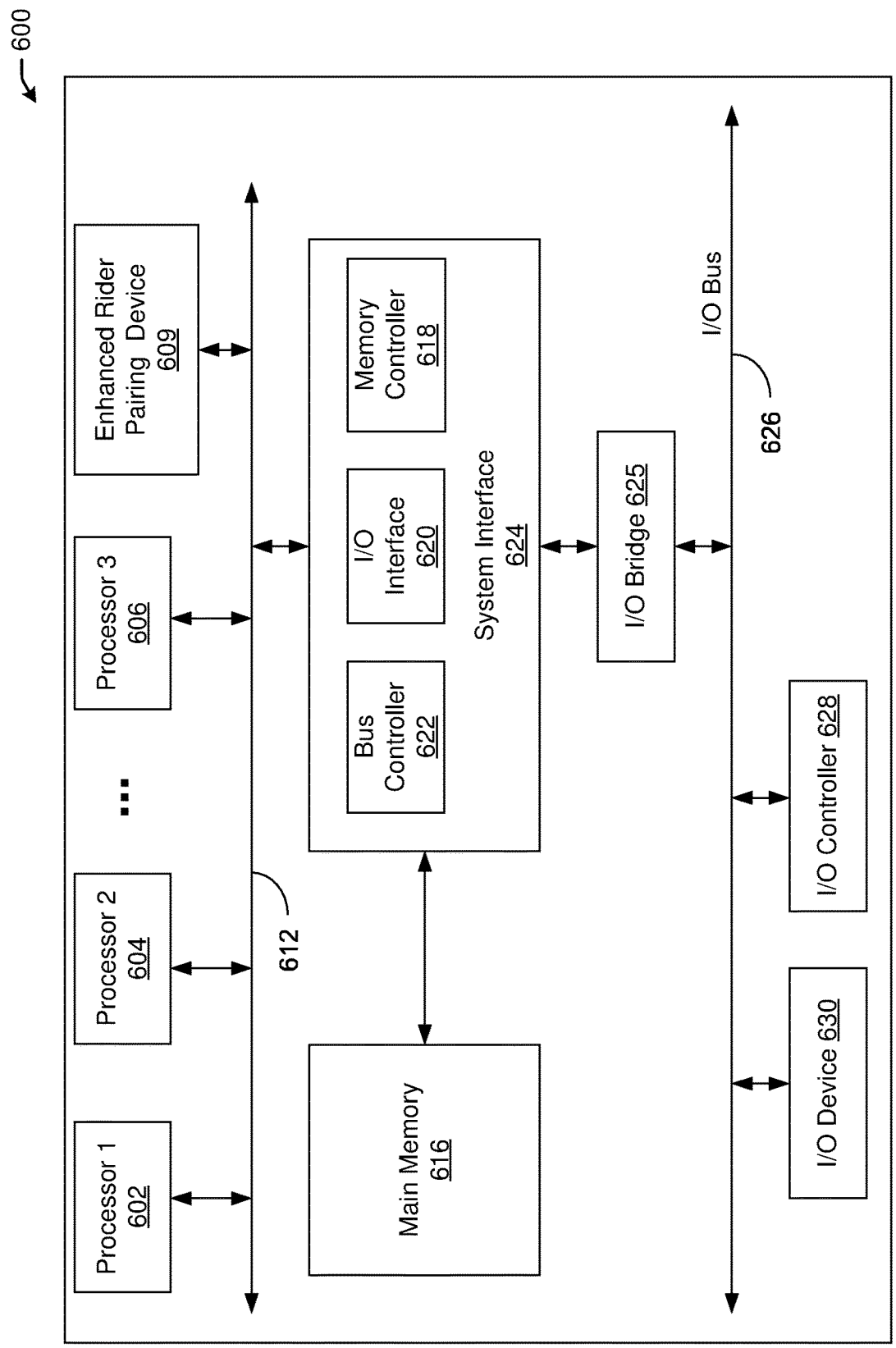
FIG. 6 is a block diagram illustrating an example of a computing device or computer system upon which any of one or more techniques (e.g., methods) may be performed, in accordance with one or more example embodiments of the present disclosure.

FIG. 6 is a block diagram illustrating an example of a computing device or computer system 600 upon which any of one or more techniques (e.g., methods) may be performed, in accordance with one or more example embodiments of the present disclosure.

For example, the computing system 600 of FIG. 6 may represent the one or more processors 132. The computer system (system) includes one or more processors 602-606. Processors 602-606 may include one or more internal levels of cache (not shown) and a bus controller (e.g., bus controller 622) or bus interface (e.g., I/O interface 620) unit to direct interaction with the processor bus 612. An enhanced rider pairing device 609 may also be in communication with the Processors 602-606 and may be connected to the processor bus 612.

Processor bus 612, also known as the host bus or the front side bus, may be used to couple the processors 602-606 and/or the enhanced rider pairing device 609 with the system interface 624. System interface 624 may be connected to the processor bus 612 to interface other components of the system 600 with the processor bus 612. For example, system interface 624 may include a memory controller 618 for interfacing a main memory 616 with the processor bus 612. The main memory 616 typically includes one or more memory cards and a control circuit (not shown). System interface 624 may also include an input/output (I/O) interface 620 to interface one or more I/O bridges 625 or I/O devices 630 with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606 and/or the enhanced rider pairing device 609. Another type of user input device includes cursor control, such as a mouse, a trackball, or cursor direction keys for communicating direction information and command selections to the processors 602-606 and/or the enhanced rider pairing device 609 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606 and/or the enhanced rider pairing device 609. Main memory 616 may also be used for storing temporary variables or other intermediate information during the execution of instructions by the processors 602-606 and/or the enhanced rider pairing device 609. System 600 may include read-only memory (ROM) and/or other static storage device coupled to the processor bus 612 for storing static information and instructions for the processors 602-606 and/or the enhanced rider pairing device 609. The system outlined in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 and/or the enhanced rider pairing device 609 to perform the process steps described herein. In alternative embodiments, circuitry may be used in place of or in combination with the software instructions. Thus, embodiments of the present disclosure may include both hardware and software components.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system. The system also includes at least one memory that stores computer-executable instructions; and at least one processor configured to access the at least one memory and execute the computer-executable instructions to pair a first user profile of a first user located at a first location with a first autonomous vehicle (AV) to complete a trip to a destination selected by the first user. The system also includes the computer-executable instructions to detect a second AV at the first location, where the second AV is associated with a second user profile. The system also includes the computer-executable instructions to connect the second AV with the first user using a connection mechanism. The system also includes the computer-executable instructions to select a profile status of the first user profile based on the connection to the second AV. The system also includes the computer-executable instructions to pair the first user profile with the second AV based on the profile status. Other embodiments of this aspect include corresponding computer systems, apparatus, and computer programs recorded on one or more computer storage devices, each configured to perform the actions of the methods.

Implementations may include one or more of the following features. The system where the connection mechanism includes scanning a quick response (QR) code, establishing a Bluetooth® connection, establishing a near-field communication (NFC), detecting a fingerprint, or performing facial recognition. To select the profile status includes the processing circuitry being further configured to evaluate criteria associated with at least one of a time of arrival, a distance between the first user and the first AV, information associated with the trip, vehicle charge level, or vehicle gas level. The profile status includes an authorized substitute or an unauthorized substitute. The processing circuitry is further configured to calculate a time of arrival of the first AV at the first location, compare the time of arrival to a time threshold and, based on the time of arrival being less than the time threshold, select the profile status as an authorized substitute. The processing circuitry is further configured to verify the trip can be completed with a current state of the first AV, and select the profile status as an authorized substitute. The processing circuitry is further configured to: select a third user profile associated with a third user as an authorized substitute to utilize the first AV at the first location, and grant the third user access to first AV. To grant access includes the processing circuitry being further configured to grant access to a locked compartment in the first AV or to an interior of the first AV. Implementations of the described techniques may include hardware, a method or process, or computer software on a computer-accessible medium.

One general aspect includes a method. The method also includes pairing a first user profile of a first user located at a first location with a first autonomous vehicle (AV) to complete a trip to a destination selected by the first user. The method also includes detecting a second AV at the first location, where the second AV is associated with a second user profile. The method also includes connecting the second AV with the first user using a connection mechanism. The method also includes selecting a profile status of the first user profile based on the connection to the second AV. The method also includes pairing the first user profile with the second AV based on the profile status. Other embodiments of this aspect include corresponding computer systems, apparatus, and computer programs recorded on one or more computer storage devices, each configured to perform the actions of the methods.

Implementations may include one or more of the following features. The method where the connection mechanism includes scanning a quick response (QR) code, establishing a Bluetooth® connection, establishing a near-field communication (NFC), detecting a fingerprint, or performing facial recognition. To select the profile status includes the processing circuitry being further configured to evaluate criteria associated with at least one of a time of arrival, a distance between the first user and the first AV, information associated with the trip, vehicle charge level, or vehicle gas level. The profile status includes an authorized substitute or an unauthorized substitute. The method further includes calculating a time of arrival of the first AV at the first location, comparing the time of arrival to a time threshold, and based on the time of arrival being less than the time threshold, selecting the profile status as an authorized substitute. The method further includes verifying the trip can be completed with a current state of the first AV, and selecting the profile status as an authorized substitute. The method further includes selecting a third user profile associated with a third user as an authorized substitute to utilize the first AV at the first location, and grant the third user access to first AV. To grant access includes the processing circuitry being further configured to grant access to a locked compartment in the first AV or to an interior of the first AV. Implementations of the described techniques may include hardware, a method or process, or computer software on a computer-accessible medium.

One general aspect includes a device. The device also includes processing circuitry being further configured to pair a first user profile of a first user located at a first location with a first autonomous vehicle (AV) to complete a trip to a destination selected by the first user. The device also includes the processing circuitry being further configured to detect a second AV at the first location, where the second AV is associated with a second user profile. The device also includes the processing circuitry being further configured to connect the second AV with the first user using a connection mechanism. The device also includes the processing circuitry being further configured to select a profile status of the first user profile based on the connection to the second AV. The device also includes the processing circuitry being further configured to pair the first user profile with the second AV based on the profile status. Other embodiments of this aspect include corresponding computer systems, apparatus, and computer programs recorded on one or more computer storage devices, each configured to perform the actions of the methods.

Implementations may include one or more of the following features. The device where the connection mechanism includes scanning a quick response (QR) code, establishing a Bluetooth® connection, establishing a near-field communication (NFC), detecting a fingerprint, or performing facial recognition. To select the profile status includes the processing circuitry being further configured to evaluate criteria associated with at least one of a time of arrival, a distance between the first user and the first AV, information associated with the trip, vehicle charge level, or vehicle gas level. The profile status includes an authorized substitute or an unauthorized substitute. Implementations of the described techniques may include hardware, a method or process, or computer software on a computer-accessible medium.

A machine-readable medium includes any mechanism for storing or transmitting information in a form (e.g., software, processing application) readable by a machine (e.g., a computer). Such media may take the form of, but are not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 616, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described, may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A system, comprising:
   at least one memory that stores computer-executable instructions; and
   at least one processor configured to access the at least one memory and execute the computer-executable instructions to perform operations comprising:
   pairing a first user profile of a first user located at a first location with a first autonomous vehicle (AV) to complete a trip to a destination selected by the first user;
   detecting a second AV at the first location, wherein the second AV is associated with a second user profile of a second user;
   connecting the second AV with the first user based on biometric information received from the first user;
   selecting a profile status of the first user profile based on the connection to the second AV and an indication that at least one of a vehicle charge level or vehicle gas level of the second AV enables the second AV to complete the trip to the destination; and
   pairing the first user profile with the second AV based on the profile status indicating that an estimated time for the first AV to arrive at the first location satisfies a temporal threshold for arrival.

2. The system of claim 1, wherein the connection mechanism further comprises scanning a quick response (QR) code, establishing a Bluetooth® connection, or establishing a near-field communication (NFC).

3. The system of claim 1, wherein the selecting the profile status further based on an indication that at least one of the vehicle charge level or the vehicle gas level enables the second AV to return to the first location after completion of the trip to the destination.

4. The system of claim 1, wherein the profile status further indicates that the first user is at least one of an authorized substitute or an unauthorized substitute, wherein the pairing the first user profile with the second AV is further based on the first user being the authorized substitute.

5. The system of claim 4, the operations further comprising:
   calculating a time of arrival of the first AV at the first location;
   comparing the time of arrival to a time threshold; and
   based on the time of arrival being less than the time threshold, selecting the profile status as an authorized substitute.

6. The system of claim 4, the operations further comprising:
   verifying the trip can be completed with a current state of the first AV; and
   selecting the profile status as an authorized substitute.

7. The system of claim 1, the operations further comprising:
selecting a third user profile associated with a third user as an authorized substitute to utilize the first AV at the first location; and
granting the third user access to first AV.

8. The system of claim 7, wherein granting the third user access further comprises granting access to a locked compartment in the first AV or to an interior of the first AV.

9. The system of claim 1, the operations further comprising unpairing the first user profile from the first AV once the first user profile is paired with the second AV.

10. The system of claim 1, the operations further comprising unpairing the first user profile from the first AV once the first user is granted access to the second AV.

11. A method comprising:
pairing a first user profile of a first user located at a first location with a first autonomous vehicle (AV) to complete a trip to a destination selected by the first user;
detecting a second AV at the first location, wherein the second AV is associated with a second user profile of a second user;
connecting the second AV with the first user based on biometric information received from the first user;
selecting a profile status of the first user profile based on the connection to the second AV and an indication that at least one of a vehicle charge level or vehicle gas level of the second AV enables the second AV to complete the trip to the destination; and
pairing the first user profile with the second AV based on the profile status indicating that an estimated time for the first AV to arrive at the first location satisfies a temporal threshold for arrival.

12. The method of claim 11, wherein the connection mechanism further comprises scanning a quick response (QR) code, establishing a Bluetooth® connection, or establishing a near-field communication (NFC).

13. The method of claim 11, wherein the selecting the profile status further based on an indication that at least one of the vehicle charge level or the vehicle gas level enables the second AV to return to the first location after completion of the trip to the destination.

14. The method of claim 11, wherein the profile status comprises an authorized substitute or an unauthorized substitute.

15. The method of claim 14, further comprising:
calculating a time of arrival of the first AV at the first location;
comparing the time of arrival to a time threshold; and
based on the time of arrival being less than the time threshold, selecting the profile status as an authorized substitute.

16. The method of claim 14, further comprising:
verifying the trip can be completed with a current state of the first AV; and
selecting the profile status as an authorized substitute.

17. The method of claim 11, further comprising:
selecting a third user profile associated with a third user as an authorized substitute to utilize the first AV at the first location; and
granting the third user access to first AV.

18. The method of claim 17, wherein granting access further comprises granting access to a locked compartment in the first AV or to an interior of the first AV.

19. A non-transitory computer-readable medium having instructions stored thereon that, when executed by at least one computing device, cause the at least one computing device to perform operations comprising:
pairing a first user profile of a first user located at a first location with a first autonomous vehicle (AV) to complete a trip to a destination selected by the first user;
detecting a second AV at the first location, wherein the second AV is associated with a second user profile of a second user;
connecting the second AV with the first user based on biometric information received from the first user;
selecting a profile status of the first user profile based on the connection to the second AV and an indication that at least one of a vehicle charge level or vehicle gas level of the second AV enables the second AV to complete the trip to the destination; and
pairing the first user profile with the second AV based on the profile status indicating that an estimated time for the first AV to arrive at the first location satisfies a temporal threshold for arrival.

20. The non-transitory computer-readable medium of claim 19, wherein the connection mechanism further comprises scanning a quick response (QR) code, establishing a Bluetooth® connection, or establishing a near-field communication (NFC).

* * * * *